United States Patent
Ishikawa

(10) Patent No.: US 8,459,288 B2
(45) Date of Patent: Jun. 11, 2013

(54) PRESSURE REDUCING VALVE AND REGULATOR FOR GAS

(75) Inventor: Kazuki Ishikawa, Miyagi (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 13/078,412

(22) Filed: Apr. 1, 2011

(65) Prior Publication Data
US 2011/0174388 A1 Jul. 21, 2011

Related U.S. Application Data

(63) Continuation of application No. 10/588,723, filed as application No. PCT/JP2005/001936 on Feb. 9, 2005, now abandoned.

(30) Foreign Application Priority Data

Feb. 10, 2004 (JP) .................................. 2004-33595
Feb. 10, 2004 (JP) .................................. 2004-33596
Feb. 10, 2004 (JP) .................................. 2004-33597

(51) Int. Cl.
| | |
|---|---|
| F16K 31/126 | (2006.01) |
| F16K 25/00 | (2006.01) |
| F16K 51/00 | (2006.01) |
| F16K 17/22 | (2006.01) |
| F16K 17/34 | (2006.01) |
| B01D 46/00 | (2006.01) |

(52) U.S. Cl.
USPC .................. 137/15.19; 137/454.5; 137/484.8; 137/505.11; 137/505.18; 137/505.36; 137/544; 251/284

(58) Field of Classification Search
USPC ............... 137/14, 15.18, 15.19, 454.5, 484.6, 137/484.8, 505, 505.11, 505.18, 505.37, 137/544, 505.36; 251/284
See application file for complete search history.

(56) References Cited

U.S. PATENT DOCUMENTS

2,114,961 A * 4/1938 Gille .............................. 137/339
2,707,966 A 5/1955 Taplin
(Continued)

FOREIGN PATENT DOCUMENTS

| JP | 1-178614 U | 12/1989 |
| JP | 2-145414 U | 12/1990 |

(Continued)

OTHER PUBLICATIONS

Gilani, N. What Is Synthetic Resin. wiseGEEK, Article [online], [retrieved on Mar. 15, 2012]. Retrieved from the Internet <URL: http://www.wisegeek.com/what-is-synthetic-resin.htm>.*

Primary Examiner — Stephen M Hepperle
Assistant Examiner — Jonathan Waddy
(74) Attorney, Agent, or Firm — Arent Fox LLP

(57) ABSTRACT

A regulator for gas having a diaphragm rod held at the center of a diaphragm of which rim is sandwiched between a body and a cover via diaphragm retainers, and a valve element capable of seating itself at a valve seat fixedly placed in the body with a valve hole opening at the center provided in an intermediate portion of a valve shaft having its one end detachably coupled to the diaphragm rod and its other end slidably fitted in a guide opening provided on the body side, wherein the body (34) is equipped with a valve action unit (120) formed by assembling in advance a valve seat member (100) having a valve hole (111) and the valve seat (112) provided thereon, a guide member (106) having a guide opening (105) and pressed into the valve seat member (100), and a valve shaft (114) having a valve element (113) provided thereon in a state of having one end of the valve shaft (114) projected from the valve hole (111) and the other end of the valve shaft (114) slidably fitted into the guide opening (105) It is thereby possible to reduce machining cost and improve assembly conformance.

14 Claims, 10 Drawing Sheets

U.S. PATENT DOCUMENTS

| | | | |
|---|---|---|---|
| 2,725,889 A * | 12/1955 | Biggle | 137/69 |
| 2,752,941 A * | 7/1956 | Orville | 137/505.18 |
| 2,946,344 A | 7/1960 | Mott | |
| 3,179,123 A * | 4/1965 | Kowalski et al. | 137/495 |
| 3,695,438 A | 10/1972 | Malpassi | |
| 4,660,597 A * | 4/1987 | Cowles | 137/505.42 |
| 4,697,617 A | 10/1987 | Bourke et al. | |
| 5,234,026 A * | 8/1993 | Patterson | 137/505.18 |
| 5,443,083 A | 8/1995 | Gotthelf | |
| 6,109,302 A | 8/2000 | Bircann | |
| 6,176,256 B1 | 1/2001 | Nakajima et al. | |
| 6,991,218 B2 * | 1/2006 | Lovell et al. | 251/357 |

FOREIGN PATENT DOCUMENTS

| | | |
|---|---|---|
| JP | 4-20115 U | 2/1992 |
| JP | 07-328364 A | 12/1995 |
| JP | 08-5112 A | 1/1996 |
| JP | 08-54935 A | 2/1996 |
| JP | 11-270719 A | 10/1999 |
| JP | 2000-205050 A | 7/2000 |
| JP | 2000-249001 A | 9/2000 |
| JP | 2002-14730 A | 1/2002 |
| JP | 2002-182751 A | 6/2002 |

* cited by examiner

PRESSURE REDUCING VALVE AND REGULATOR FOR GAS

CROSS-REFERENCE TO RELATED APPLICATION

This application is a Continuation of U.S. application Ser. No. 10/588,723, filed Aug. 8, 2007, which is a National Stage entry of International Application No. PCT/JP2005/001936, filed Feb. 9, 2005, the entire specifications claims and drawings of which are incorporated herewith by reference.

TECHNICAL FIELD

The present invention relates to a pressure reducing valve and a regulator for gas, and in particular to the pressure reducing valve including a valve housing made by combining a body and a cover, a diaphragm of which rim is sandwiched between the body and the cover, a diaphragm rod held at the center of the diaphragm via a diaphragm retainer, a valve shaft having one end thereof detachably coupled to the diaphragm rod and the other end slidably fitted in a guide opening provided on the body side, and a valve element provided in an intermediate portion of the valve shaft and capable of being seated at a valve seat fixedly placed in the body and opening a valve hole for having the valve shaft movably inserted therein at the center, and the regulator for gas including the pressure reducing valve.

BACKGROUND ART

Such pressure reducing valve and regulator for gas are already known from Patent Document 1.
Patent Document 1:
Japanese Patent Application Laid-open No. 2002-182751

DISCLOSURE OF THE INVENTION

Problems to be Solved by the Invention

As for the pressure reducing valve disclosed in the Patent Document 1, however, a valve seat member having the valve seat is threadedly fitted over the body and the valve shaft is slidably fitted in the guide opening provided directly on the body. Therefore, to keep the valve seat of the valve seat member and the guide opening coaxial, it is necessary to machine the guide opening of the body with high precision, which leads to an increase in machining cost as well as reduction in assembly conformance.

The present invention has been implemented in view of such circumstances, and a first object thereof is to provide the pressure reducing valve of which machining cost is reduced and assembly conformance is improved.

As for the regulator for gas disclosed in the Patent Document 1, an oil filter for eliminating oil included in the gas of which pressure is reduced by the pressure reducing valve is provided independently from the body partway along a duct connected to the body, leading to complication and high production costs of a gas pressure reducing system.

The present invention has been implemented in view of such circumstances, and a second object thereof is to provide the regulator for gas having the oil filter provided thereon so as to allow simplification and cost reduction of the gas pressure reducing system while reducing the machining cost and improving the assembly conformance.

Means for Solving the Problems

In order to achieve the first object, according to a first feature of the present invention, there is provided a pressure reducing valve comprising a valve housing made by combining a body and a cover, a diaphragm of which rim is sandwiched between the body and the cover, a diaphragm rod held at the center of the diaphragm via a diaphragm retainer, a valve shaft having one end thereof detachably coupled to the diaphragm rod and the other end slidably fitted into a guide opening provided on the body side, and a valve element provided in an intermediate portion of the valve shaft and capable of being seated at a valve seat fixedly placed in the body and opening a valve hole for having the valve shaft movably inserted therein at the center, characterized in that a valve action unit is mounted to the body in a state of having one end of the valve shaft projected from the valve hole and the other end of the valve shaft slidably fitted into the guide opening, the valve action unit being formed by assembling in advance a valve seat member having the valve hole and the valve seat provided thereon, a guide member having the guide opening and pressed into the valve seat member, and the valve shaft on which the valve element is provided.

According to a second feature of the present invention, in addition to the arrangement of the first feature, there is provided the pressure reducing valve, wherein a fitting concave portion for swingably fitting a voluminous portion provided at one end of the valve shaft is coaxially provided at the end of the valve shaft side of the diaphragm rod, and a clip member engaged with the voluminous portion from the valve seat member side is detachably inserted into a slit provided on the diaphragm rod along a plane orthogonal to an axis line of the diaphragm rod.

According to a third feature of the present invention, in addition to the arrangement of the first feature, there is provided the pressure reducing valve, wherein the body has a concave portion facing the diaphragm side provided thereon, and a bulkhead member has the valve shaft penetrate airtightly and movably and partitions a pressure action chamber facing a face of the diaphragm and a decompression chamber for generating a gas pressure acting on the pressure action chamber and thereby penetrating the valve hole, the bulkhead member being made by press-stamping a sheet iron and fixed on the body in the state of fitting into the concave portion.

According to a fourth feature of the present invention, in addition to the arrangement of the third feature, there is provided the pressure reducing valve, wherein the bulkhead member is fixed on the body with a bolt having a diameter expansion head for regulating a deflection to the pressure action chamber side of the diaphragm by contacting a plane on the pressure action chamber side of the diaphragm.

According to a fifth feature of the present invention, in addition to the arrangement of the third feature, there is provided the pressure reducing valve, wherein the bulkhead member has a continuous hole leading to the pressure action chamber in a portion contacting an inner surface of the concave portion, the body has an outlet passage leading to the decompression chamber, and an aspirator passage provided on the body with one end thereof leading to the continuous hole has the other end communicating with the outlet passage.

According to a sixth feature of the present invention, in addition to the arrangement of the fifth feature, there is provided the pressure reducing valve, wherein the other end of the aspirator passage is connected to an aspirator tube mounted on the body with an opening toward a downstream side of a gas flow direction inside the outlet passage.

To achieve the second object, according to a seventh feature of the present invention, there is provided a regulator for gas including the pressure reducing valve of the first feature, wherein at least an electromagnetic isolation valve and the pressure reducing valve are provided on the body on which an inlet passage and the outlet passage are provided so as to intervene between the inlet passage and the outlet passage, and an oil filter mounted between the pressure reducing valve and the outlet passage is placed on the body.

According to an eighth feature of the present invention, in addition to the arrangement of the seventh feature, there is provided the regulator for gas, wherein the body has a mounting concave portion provided thereon, and the oil filter having one end thereof inserted into the mounting concave portion is sandwiched between the body and a filter cover detachably mounted on the body by covering a projection of the oil filter from the body.

According to a ninth feature of the present invention, in addition to the arrangement of the eighth feature, there is provided the regulator for gas, wherein the oil filter has a mesh portion for allowing a gas flow in a part of a side wall of a cylindrical filter case made of a synthetic resin, the body has a catching hole opening at a closed end of the mounting concave portion provided thereon to lead to a gas passage provided on the body so as to lead a gas pressure-reduced by the pressure reducing valve, an elastic member has integrally a cylinder for fitting the one end into the catching hole elastically and a collar portion jutting outward from the cylinder by being sandwiched between one end of the filter case and the closed end of the mounting concave portion mounted thereon, the elastic member being mounted to one end of the filter case to have the cylinder lead to the inside of the filter case, and an oil storage chamber for storing the oil oozing from the mesh portion of the oil filter is formed around the oil filter in the filter cover so as to have an upper end of the oil storage chamber lead to the outlet passage.

According to a tenth feature of the present invention, in addition to the arrangement of the eighth feature, there is provided the regulator for gas, wherein a drain hole liquid-tightly closed by a drain bolt is provided at the bottom of the filter cover.

According to an eleventh feature of the present invention, in addition to the arrangement of any one of the eighth to tenth features, there is provided the regulator for gas, wherein a relief valve is mounted on the filter cover.

Furthermore, according to a twelfth feature of the present invention, in addition to the arrangement of the ninth feature, there is provided the regulator for gas, wherein the filter cover is mounted on an undersurface of the body, a part of the pressure reducing valve is mounted on the body from topside of the body, and a back-pressure hole for exerting a back pressure on the pressure reducing valve is provided on the body while leading to the oil storage chamber.

Effect of the Invention

With the first feature of the present invention, the valve action unit formed by assembling the guide member, valve seat member and valve shaft in advance is mounted on the body. Therefore, it is easy to improve coaxial accuracy of the guide opening of the guide member and the valve seat of the valve seat member of which machining accuracy is easily improvable since they are smaller than the body. It is possible to improve assembly conformance besides improving the coaxial accuracy while reducing costs by avoiding improvement in the machining accuracy in a portion leading to increased costs. Furthermore, it is also easy to check airtightness and performance on the valve action unit alone to allow improvement in yield.

With the second feature of the present invention, it is possible to swingably couple the valve shaft to the diaphragm rod. Therefore, it is possible, even if the axis line of the diaphragm rod deviates from the axis lines of the valve seat and guide opening, to couple the valve shaft to the diaphragm rod while maintaining the axis lines with the guide opening and valve seat. Thus, it is possible to improve seat performance on seating the valve element on the valve seat and prevent the diaphragm from slanting and sagging due to inclination of the valve shaft so as to improve pressure reduction controllability. Furthermore, in the case of coupling the valve shaft to the diaphragm rod by threaded fitting, there is a possibility of leading to reduction in the assembly conformance and reduction in reliability due to generation of chips. However, it is possible to improve the assembly conformance and reliability since a clip member inserted into the slit of the diaphragm rod just has to be engaged with the voluminous portion at one end of the valve shaft.

With the third feature of the present invention, the bulkhead member formed by a sheet is fitted into the concave portion of the body and is fixed on the body. Therefore, no bulkhead is mounted between the body and the cover, and so it is possible to miniaturize the pressure reducing valve and form the bulkhead member at low cost.

With the fourth feature of the present invention, the deflection of the diaphragm to the pressure action chamber side is regulated by the diameter expansion head of the bolt. Thus, it is not necessary to provide a portion for regulating the deflection of the diaphragm to the bulkhead member, so that the form of the bulkhead member can be simplified.

With the fifth feature of the present invention, it is possible to improve pressure reduction control performance by preventing the gas of the decompression chamber from acting directly on the pressure action chamber.

With the sixth feature of the present invention, the gas in the aspirator tube and aspirator passage is drawn by the gas flow flowing in the outlet passage, and therefore, it is possible to exert a more stable pressure on the pressure action chamber so as to improve the pressure reduction control performance.

With the seventh feature of the present invention, the oil filter is mounted on the body, and therefore, at least the electromagnetic isolation valve, pressure reducing valve and oil filter are integrated on the body so as to simplify a gas pressure reducing system and reduce the costs.

With the eighth feature of the present invention, the oil filter is sandwiched between the body and the filter cover to facilitate mounting of the oil filter and set capacity of the oil filter as large as possible while miniaturizing the body.

With the ninth feature of the present invention, it is possible to mount the oil filter connected to the downstream side of the pressure reducing valve on the body airtightly and securely, and its removal is also easy. Furthermore, it is easy to prevent the oil from flowing out to the outlet passage side by storing the oil oozing from the oil filter in the oil storage chamber.

With the tenth feature of the present invention, it is easy to remove the oil stored in the oil storage chamber on inspection to improve maintainability.

With the eleventh feature of the present invention, it is possible to make it unnecessary to secure a space for placing the relief valve on the body side so as to miniaturize the body. Furthermore, it is possible to make it unnecessary to provide a passage leading to the relief valve on the body so as to simplify a passage form inside the body and enhance a degree of freedom in terms of passage placement.

Furthermore, with the twelfth feature of the present invention, it is possible to render an assembly direction of the pressure reducing valve opposite to the assembly direction of the filter cover on the body so as to improve the assembly conformance of the pressure reducing valve. And it is thereby possible to simplify the passage form leading to the pressure reducing valve inside the body and exert the back pressure on the pressure reducing valve with a simple structure.

DESCRIPTION OF THE REFERENCE NUMERALS AND CHARACTERS

Figure 1:
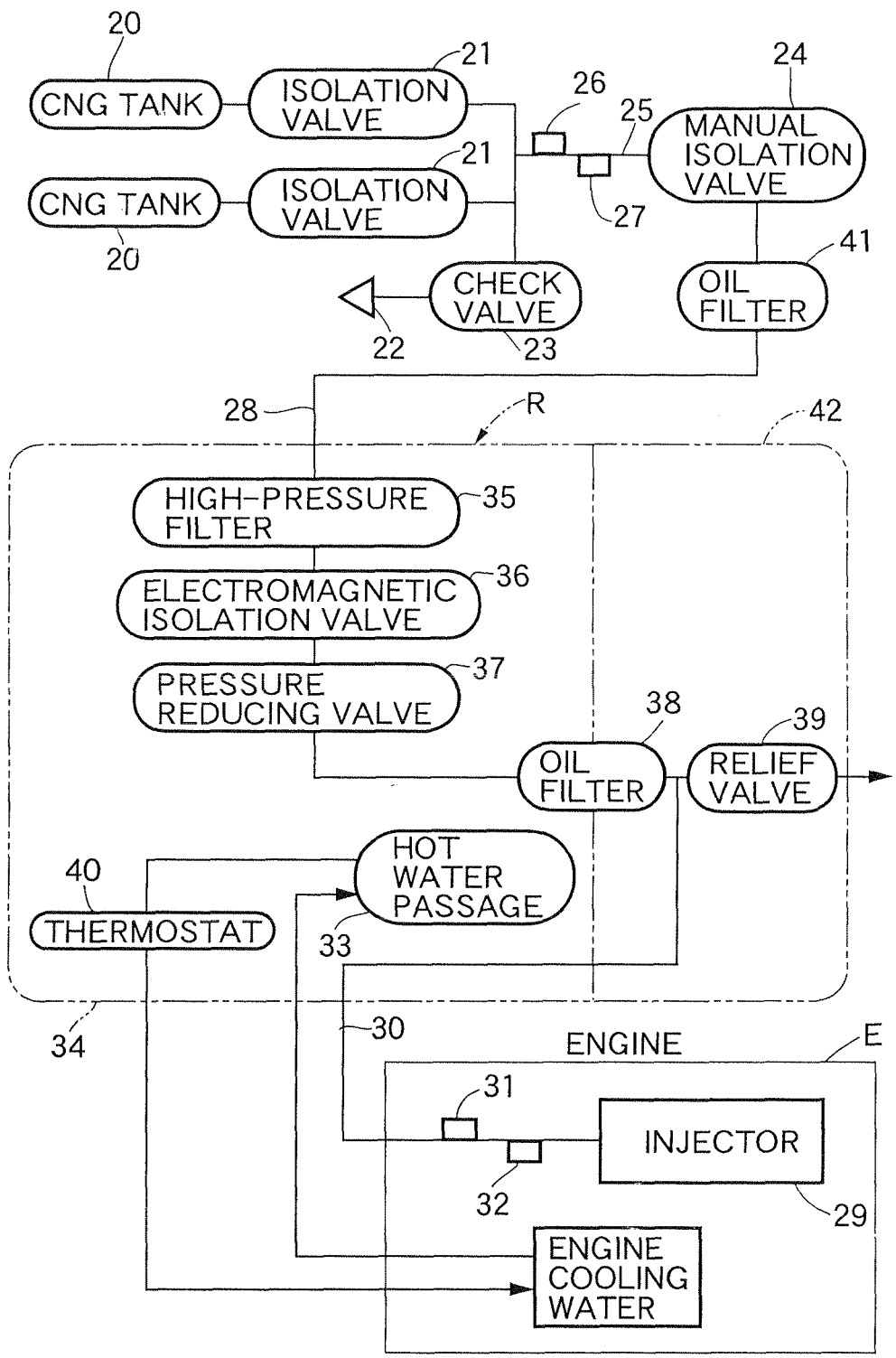
FIG. 1 is a diagram schematically showing a structure of a fuel gas supply apparatus (first embodiment).
Figure 2:
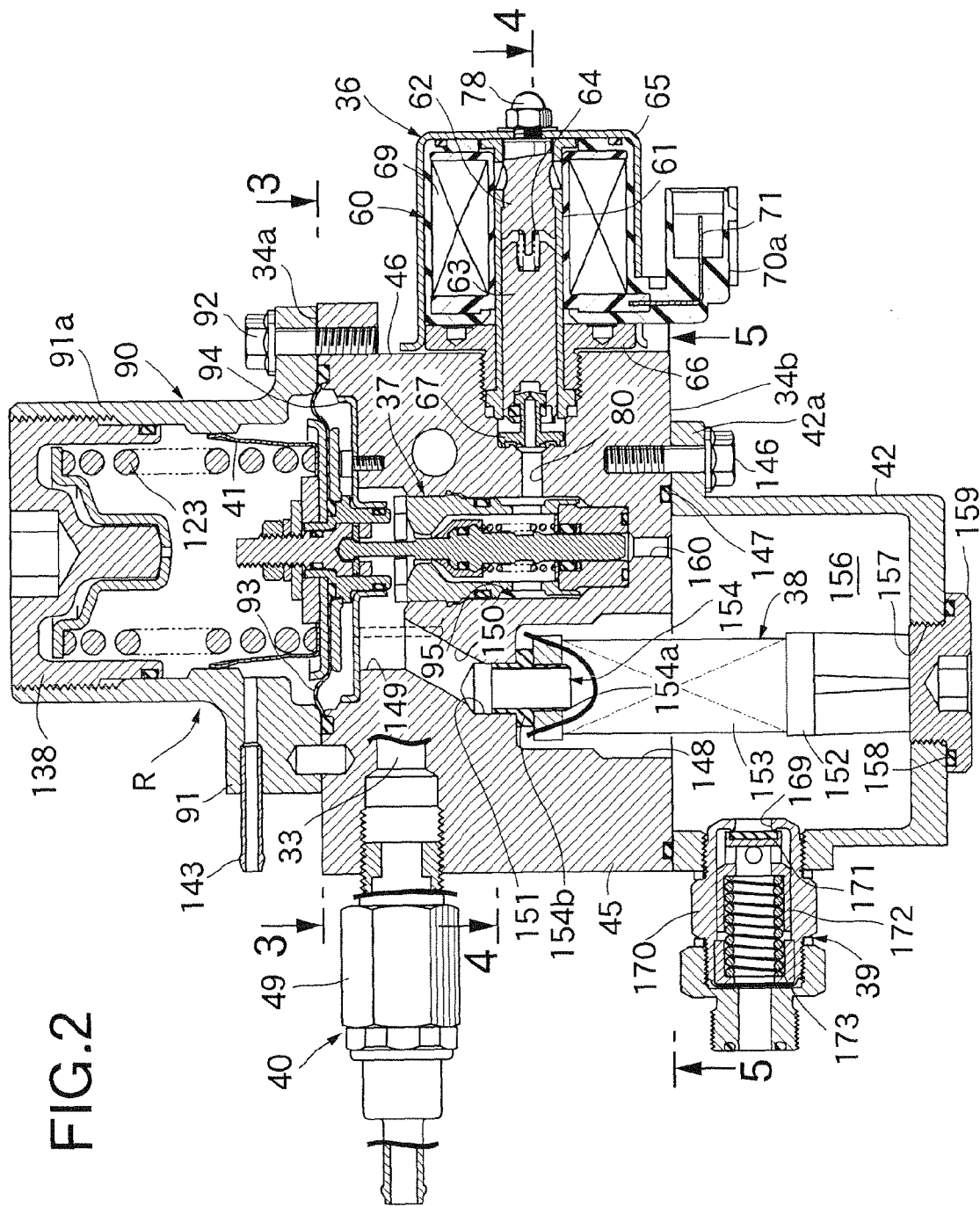
FIG. 2 is a longitudinal section of a regulator for gas along a line 2 to 2 of FIG. 3 (first embodiment).
Figure 3:
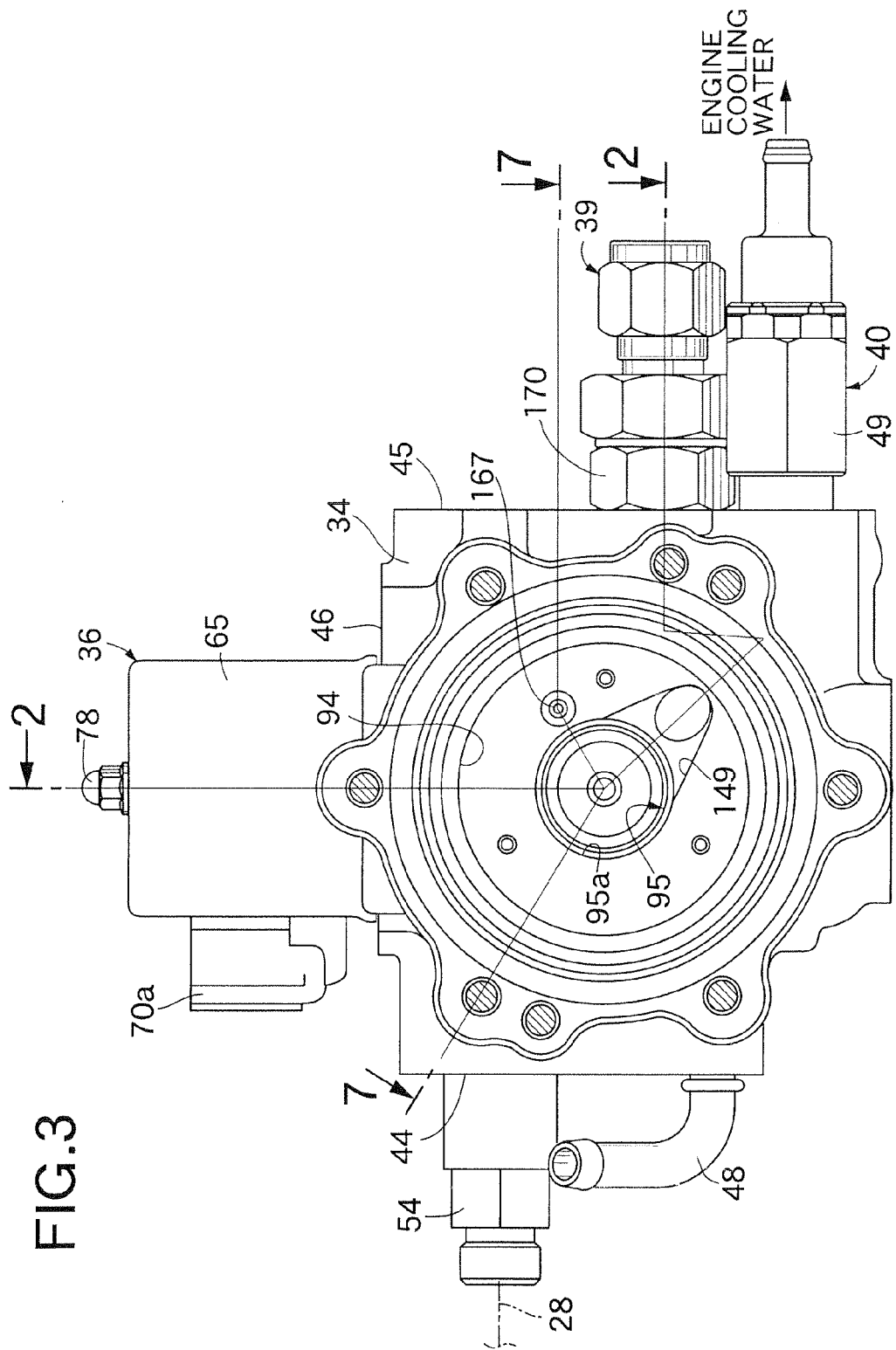
FIG. 3 is a diagram of a body after eliminating a pressure reducing valve viewed from arrowed line 3-3 in FIG. 2 (first embodiment).

34 . . . Body
34a . . . Top surface
34b Undersurface
36 . . . Electromagnetic isolation valve
37 . . . Pressure reducing valve
38 . . . Oil filter
39 . . . Relief valve
59 . . . Inlet passage
90 . . . Valve housing
91 . . . Cover
93 . . . Diaphragm
94 . . . Concave portion
96 . . . Bulkhead member
98 . . . Bolt
98a . . . Diameter expansion head
100 . . . Valve seat member
101 . . . Decompression chamber
105 . . . Guide opening
106 . . . Guide member
111 . . . Valve hole
112 . . . Valve seat
113 . . . Valve element
114 . . . Valve shaft
114a . . . Voluminous portion
120 . . . Valve action unit
121 . . . Pressure action chamber
122 . . . Spring chamber
123 . . . Spring
125, 127 . . . Diaphragm retainers
128 . . . Diaphragm rod
135 . . . Fitting concave portion
136 . . . Slit
137 . . . Clip member
148 . . . Mounting concave portion
150 . . . Gas passage
151 . . . Catching hole
152 . . . filter case
153 . . . Mesh portion
154 . . . Elastic member
154a . . . Cylinder
154b . . . Collar portion
156 . . . Oil storage chamber
157 . . . Drain hole
159 . . . Drain bolt
160 . . . Back-pressure hole
164 . . . Outlet passage
166 . . . Continuous hole
167 . . . Aspirator passage
168 . . . Aspirator tube
R . . . Regulator for gas

BEST MODE FOR CARRYING OUT THE INVENTION

Hereunder, a mode for carrying out the present invention will be described based on one embodiment of the present invention shown in the attached drawings.

Embodiment I

FIGS. 1 to 11 show one embodiment of the present invention.

First, in FIG. 1, a compressed natural gas (hereafter, referred to as CNG) which is a fuel gas is stored in one or more CNG tanks 20 at a high pressure of 25 to 1 MPa. Container isolation valves 21 provided to the CNG tanks 20 respectively are connected in common to a charging opening 22 via a check valve 23 and are also connected in common to a manual isolation valve 24. A pressure sensor 26 and a temperature sensor 27 are placed in a duct 25 between the container isolation valves 21 and the manual isolation valve 24.

When opening the container isolation valves 21 and the manual isolation valve 24, the CNG from the CNG tanks 20 is led to a regulator for gas R via a high-pressure duct 28 having an oil filter 41 for removing oil mixable on charging the CNG into the CNG tanks 20 with a compressor. The CNG pressure-reduced to 0.2 to 0.3 MPa by the regulator for gas R is led to an injector 29 of an engine E via a duct 30 to which temperature sensor 31 and a pressure sensor 32 are placed.

The regulator for gas R is comprised of a high-pressure filter 35, an electromagnetic isolation valve 36, a pressure reducing valve 37, an oil filter 38 and a thermostat 40 placed on a body 34 having a hot water passage 33, and a relief valve 39 placed on a filter cover 42 mounted on the body 34.

The high-pressure filter 35 eliminates impurities included in the CNG led from the manual isolation valve 24 via the high-pressure duct 28. The pressure reducing valve 37 acts to reduce the pressure of high-pressure CNG of 25 to 1 MPa having its impurities eliminated by the high-pressure filter 35 to 0.2 to 0.3 MPa for instance. And the electromagnetic isolation valve 36 interrupts between the high-pressure filter 35 and the pressure reducing valve 37 to stop supply of the CNG in conjunction with a shutdown of the engine E.

The hot water passage 33 of the body 34 has engine cooling water let into it from the engine E in order to keep temperature of the body 34 from becoming excessively low in conjunction with pressure reduction action of the pressure reducing valve 37. The thermostat 40 is mounted on the body 34 at a return end of the engine cooling water from the hot water passage 33 to the engine E side. The thermostat 40 opens its valve when the engine cooling water flowing in the hot water passage 33 exceeds 80 degrees C. for instance, and thereby prevents the temperature of the body 34 from rising excessively.

With reference to FIGS. 2 to 5 together, the body 34 has on its outer surface first and second side faces 44 and 45 formed as planes mutually facing opposite sides and mutually parallel and a flat third side face 46 along the plane orthogonal to the first and second side faces 44 and 45. The high-pressure filter 35 is mounted on the body 34 from the first side face 44 side, and the electromagnetic isolation valve 36 is mounted on the body 34 from the third side face 46 side. The first side face 44 has a connecting pipe 48 for leading the engine cooling water from the engine E to the hot water passage 33 provided on the body 34 mounted thereon. And the second side face 45 has a housing 49 of the thermostat 40 engaged therewith so as to lead to an outlet side of the hot water passage 33.

Figure 4:
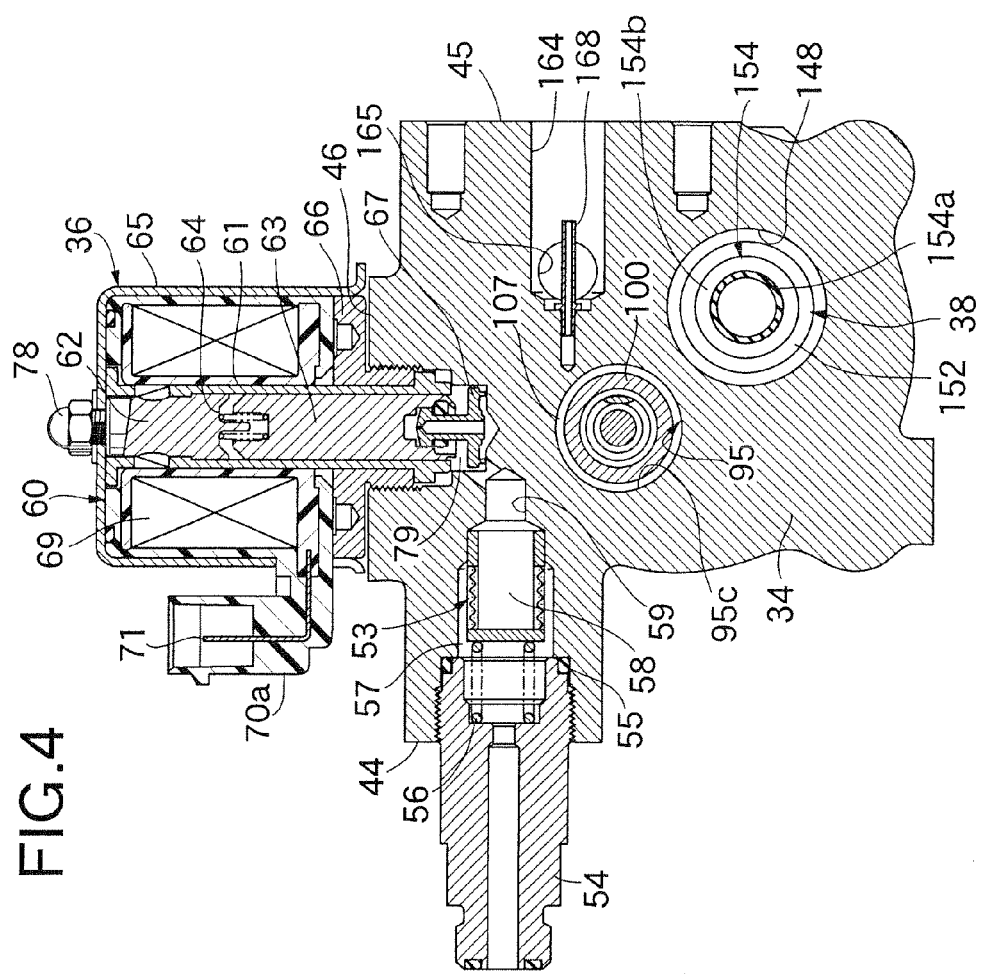
FIG. 4 is a sectional view taken along a line 4-4 in FIG. 2 (first embodiment).
Figure 5:
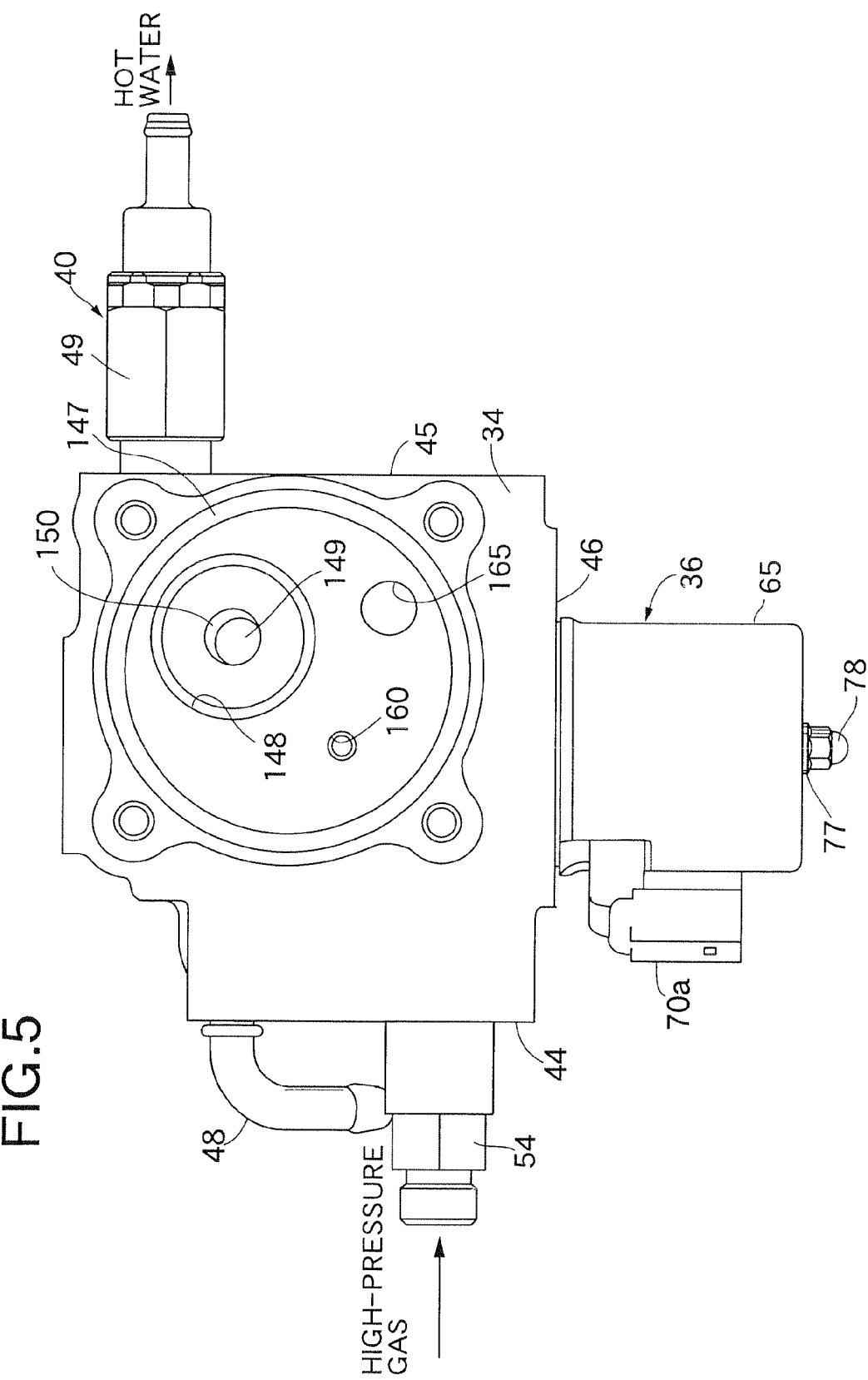
FIG. 5 is a diagram of the body after eliminating an oil filter viewed from arrowed line 5-5 in FIG. 2 (first embodiment).

Paying attention to FIG. 4 in particular, a concave portion 53 is provided on the first side face 44 of the body 34. A pipe joint 54 is engaged between its inner end and the body 34 on an outer end portion of the concave portion 53 by sandwiching an annular seal member 55, and the high-pressure duct 28 for leading the CNG from the manual isolation valve 24 is connected to the outer end portion of the pipe joint 54. The concave portion 53 has the high-pressure filter 35 fitted therein with a space between it and the inner end of the pipe joint 54, and a spring 56 for exerting a spring force to press the high-pressure filter 35 onto an inner end blocked portion of the concave portion 53 is provided between the high-pressure filter 35 and the pipe joint 54.

An annular unpurified chamber 57 leading to the inside of the pipe joint 54 is formed between an outer circumference of the high-pressure filter 35 fitted into the concave portion 53 and the body 34. The body 34 has an inlet passage 59 leading to a purifying chamber 58 in the high-pressure filter 35 provided thereon. Thus, the CNG led via the high-pressure duct 28 penetrates the high-pressure filter 35 from the unpurified chamber 57 and flows into the purifying chamber 58 so that the CNG having its impurities eliminated is led to the inlet passage 59.

Figure 6:
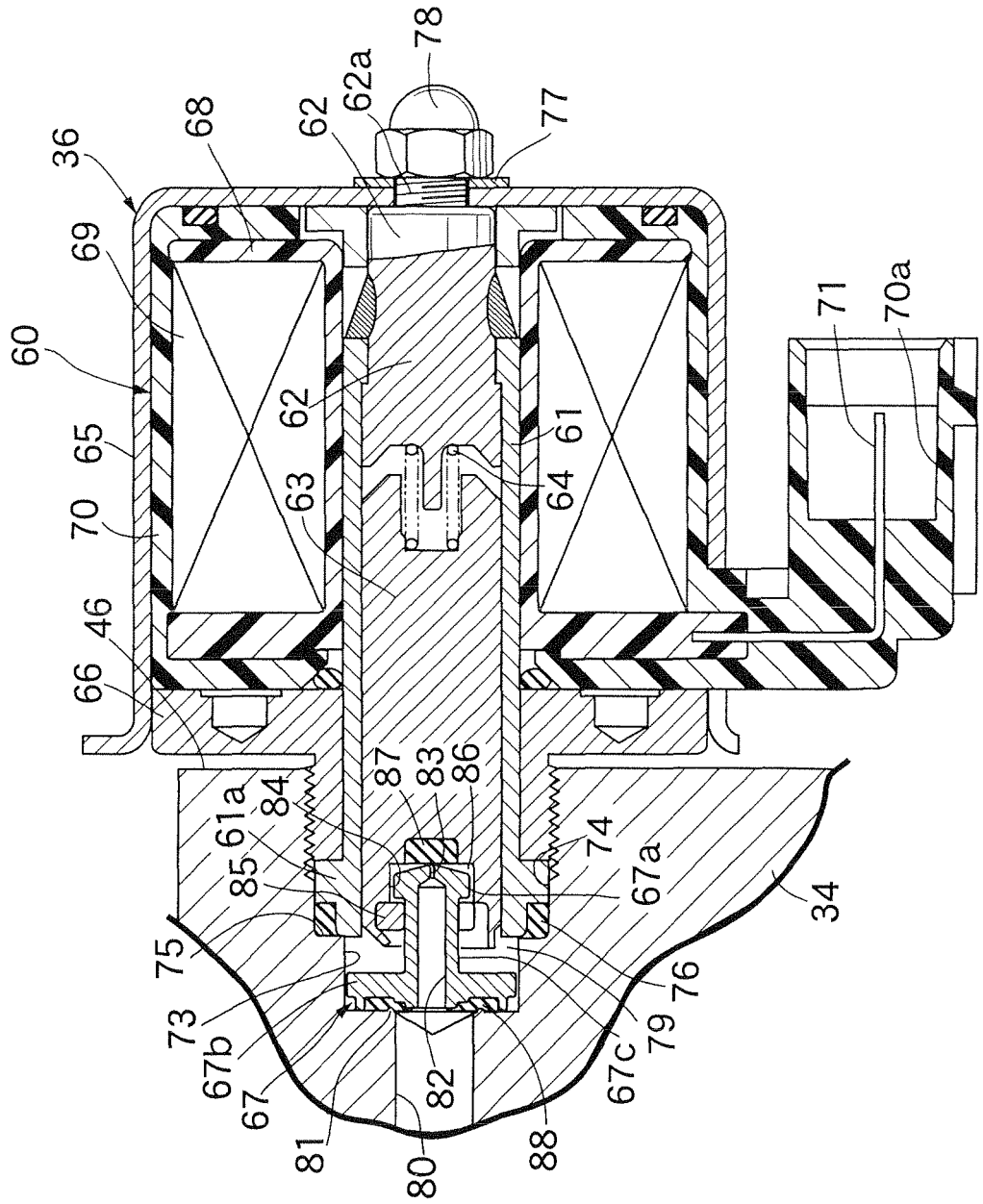
FIG. 6 is an enlarged longitudinal section of an electromagnetic isolation valve (first embodiment).

With reference to FIG. 6 in addition, the electromagnetic isolation valve 36 is mounted at a position corresponding to the high-pressure filter 35 on the third side face 46 of the body 34.

The electromagnetic isolation valve 36 comprises a coil assembly 60, a guide tube 61 made of a nonmagnetic material having its one end side inserted into the coil assembly 60 and the other end side fixed on the body 34, a fixed core 62 firmly fixed to the guide tube 61 by closing up one end of the guide tube 61, a plunger 63 slidably fitted in the guide tube 61 to be opposed to the fixed core 62, a return spring 64 provided between the fixed core 62 and the plunger 63, a solenoid housing 65 made of a magnetic metal fixed to the fixed core 62 by covering the coil assembly 60, a magnetic base frame 66 screwed on the body 34 by sandwiching the coil assembly 60 between itself and the solenoid housing 65, and a valve member 67 held by the plunger 63 on the opposite side to the fixed core 62.

The coil assembly 60 has a bobbin 68 made of a synthetic resin and a coil 69 wound by the bobbin 68 covered by a covering portion 70 made of a synthetic resin. The portion on the body 34 side of the covering portion 70 has a coupler portion 70a facing a pair of joining terminals 71 continuing to the coil 69 integrally provided to project outward, where conductors not shown are connected to the joining terminals 71 of the coupler portion 70a.

The third side face 46 of the body 34 has a small-diameter hole 73 having its inner end closed and a large-diameter hole 74 of a larger diameter than the small-diameter hole 73 continuing coaxially to the outer end of the small-diameter hole 73 provided thereon by forming an annular stage portion 75 facing outward between them. The outer surface on the other end of the guide tube 61 having its one end inserted into the bobbin 68 has a collar portion 61a for rendering an outer circumferential face of the large-diameter hole 74 close and opposed to the inner surface thereof integrally provided by jutting radially outside. The other end of the guide tube 61 is inserted into the large-diameter hole 74 by sandwiching an annular seal portion 76 between a collar portion 61a and the stage portion 75.

The magnetic base frame 66 is mounted on the body 34 by getting screwed into the large-diameter hole 74. Furthermore, the seal portion 76 and collar portion 61a are sandwiched between the stage portion 75 and the magnetic base frame 66 so that the guide tube 61 is also fixed on the body 34.

A screw shaft portion 62a penetrating the center of a closed end of the solenoid housing 65 formed like a bottomed cylinder is placed integrally and continuously on the fixed core 62. A projection of the screw shaft portion 62a from the solenoid housing 65 has a hexagon cap nut 78 screwed thereon by having a washer 77 intervening between itself and the solenoid housing 65. Therefore, the center of the closed end of the solenoid housing 65 is fixed on the fixed core 62 by fastening the hexagon cap nut 78.

The other end of the guide tube 61 is fixed on the body 34 in a state of being inserted into the large-diameter hole 74, and the plunger 63 is slidably fitted in the guide tube 61. Thus, a main valve chamber 79 is formed between the inner end portion of the small-diameter hole 73 provided on the body 34 and the other ends of the guide tube 61 and the plunger 63 Furthermore, the inlet passage 59 leading to the purifying chamber 58 of the high-pressure filter 35 communicates with the main valve chamber 79 so that the CNG having its impurities eliminated by the high-pressure filter 35 is led to the main valve chamber 79.

A passage 80 is provided on the body 34 to have an opening at the center of the inner end portion of the small-diameter hole 73. And an annular valve seat 81 slightly projecting to the main valve chamber 79 side is provided on the body 34 by surrounding an opening end of the passage 80 to the main valve chamber 79.

The valve member 67 is comprised of a pilot valve portion 67a on its one end side formed like a disc having a taper face of which diameter becomes smaller toward the plunger 63 side on its one end face and a main valve portion 67b on the other end side formed like a disc opposed to the inner end portion of the small-diameter hole 73 placed integrally and continuously via a coupled tube portion 67c constituting a step between the valve portions 67a and 67b. The diameter of the pilot valve portion 67a is set smaller than that of the main valve portion 67b. At the center of the valve member 67, there are a first passage 82 constantly communicating with the passage 80 and a second passage 83 communicating with the first passage 82 and opening at the center of the one end face of the pilot valve portion 67a coaxially provided, where the second passage 83 is formed to have a smaller diameter than the first passage 82.

The plunger 63 has a concave portion 84 for having the pilot valve portion 67a inserted provided at the end portion facing the main valve chamber 79. The pilot valve portion 67a is loosely inserted into the concave portion 84 while prevented from coming off the concave portion 84 by a C-shaped retaining ring 85 fixed at the other end of the plunger 63, and a pilot valve chamber 86 leading to the main valve chamber 79 is formed between the pilot valve portion 67a and the plunger 63. A rubber seal 87 for closing up the opening to the pilot valve chamber 86 of the second passage 83 is buried in the center of the closed end of the concave portion 84 on seating the center of the one end of the pilot valve portion 67a. The retaining ring 85 is fixed on the plunger 63 at the position at which the pilot valve portion 67a is capable of axial relative displacement with the plunger 63 between the closed end of the concave portion 84 and the retaining ring 85.

The main valve portion 67b has an annular rubber seal 88 for being seated on the valve seat 81 and interrupting between the main valve chamber 79 and the passage 80 buried on the face opposed to the closed end of the small-diameter hole 73.

As for such a electromagnetic isolation valve 36, on interrupting the supply of power to the coil 60, the plunger 63 is moved by the spring force of the return spring 64 in a direction away from the fixed core 62, the rubber seal 88 of the main valve portion 67b gets seated on the valve seat 81 to interrupt between the main valve chamber 79 and the passage 80, and the pilot valve portion 67a gets seated on the rubber seal 87 to interrupt between the pilot valve chamber 86 and the passage 80 so as to stop the supply of the high-pressure CNG to the passage 80 side.

If the power is supplied to the coil 60, the plunger 63 moves to the fixed core 62 side just enough to break the pilot valve portion 67a away from the rubber seal 87 first, and the second passage 83 communicating with the passage 80 via the first passage 82 now communicates with the pilot valve chamber 86. Thus, the CNG gradually flows into the passage 80 from the main valve chamber 79 by way of the pilot valve chamber 86, second passage 83 and first passage 82, and a difference between the pressures exerted on the main valve portion 67b from the main valve chamber 79 and the passage 80 side thereby becomes smaller. When an electromagnetic force of the coil 60 gets over a differential pressure exerted on the main valve portion 67b, the plunger 63 moves further to the fixed core 62 side and the rubber seal 88 of the main valve portion 67b breaks away from the valve seat 81 so that the CNG flows from the main valve chamber 79 to the passage 80.

Figure 7:
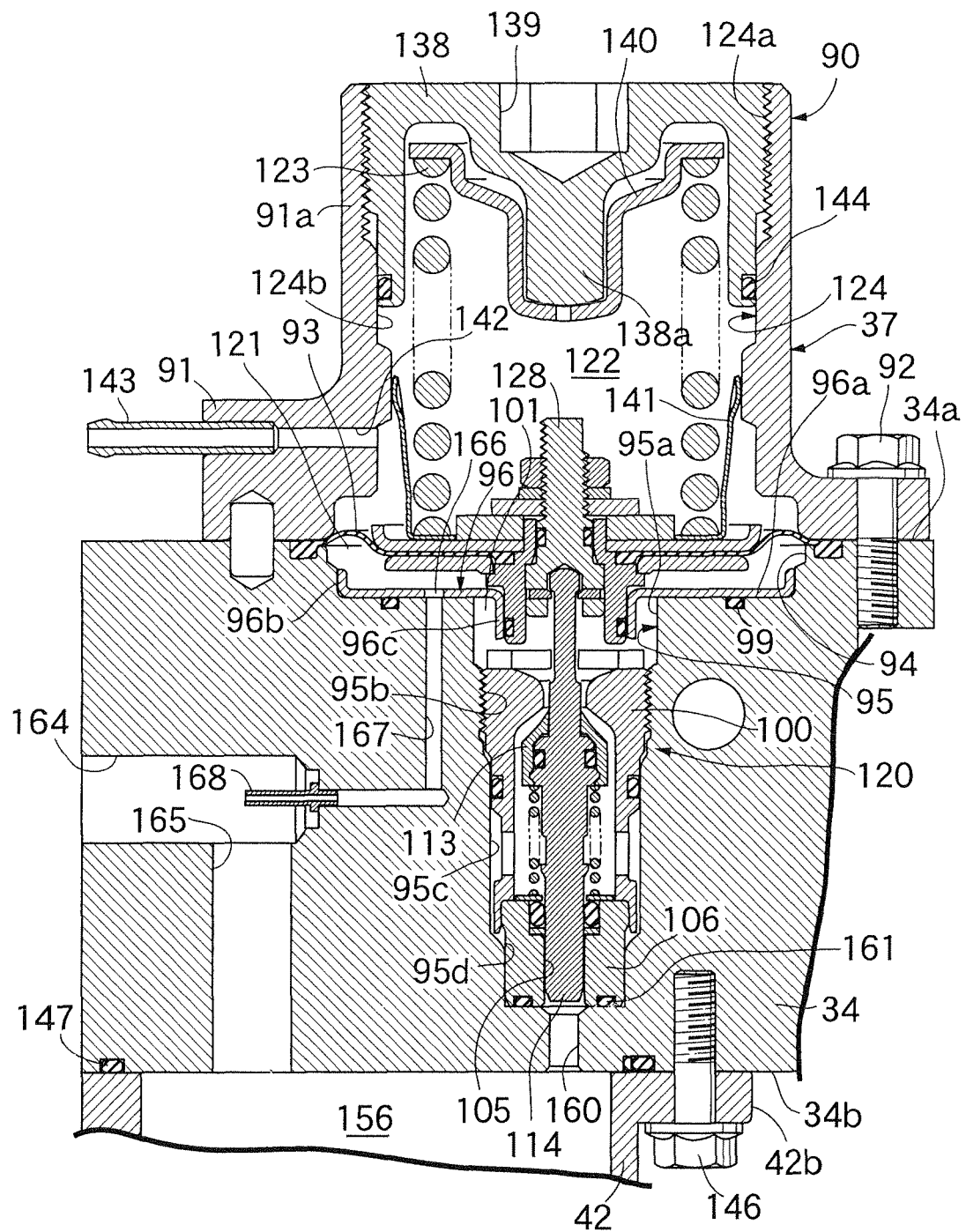
FIG. 7 is an enlarged longitudinal section of the pressure reducing valve along a line 7-7 in FIG. 3 (first embodiment).
Figure 8:
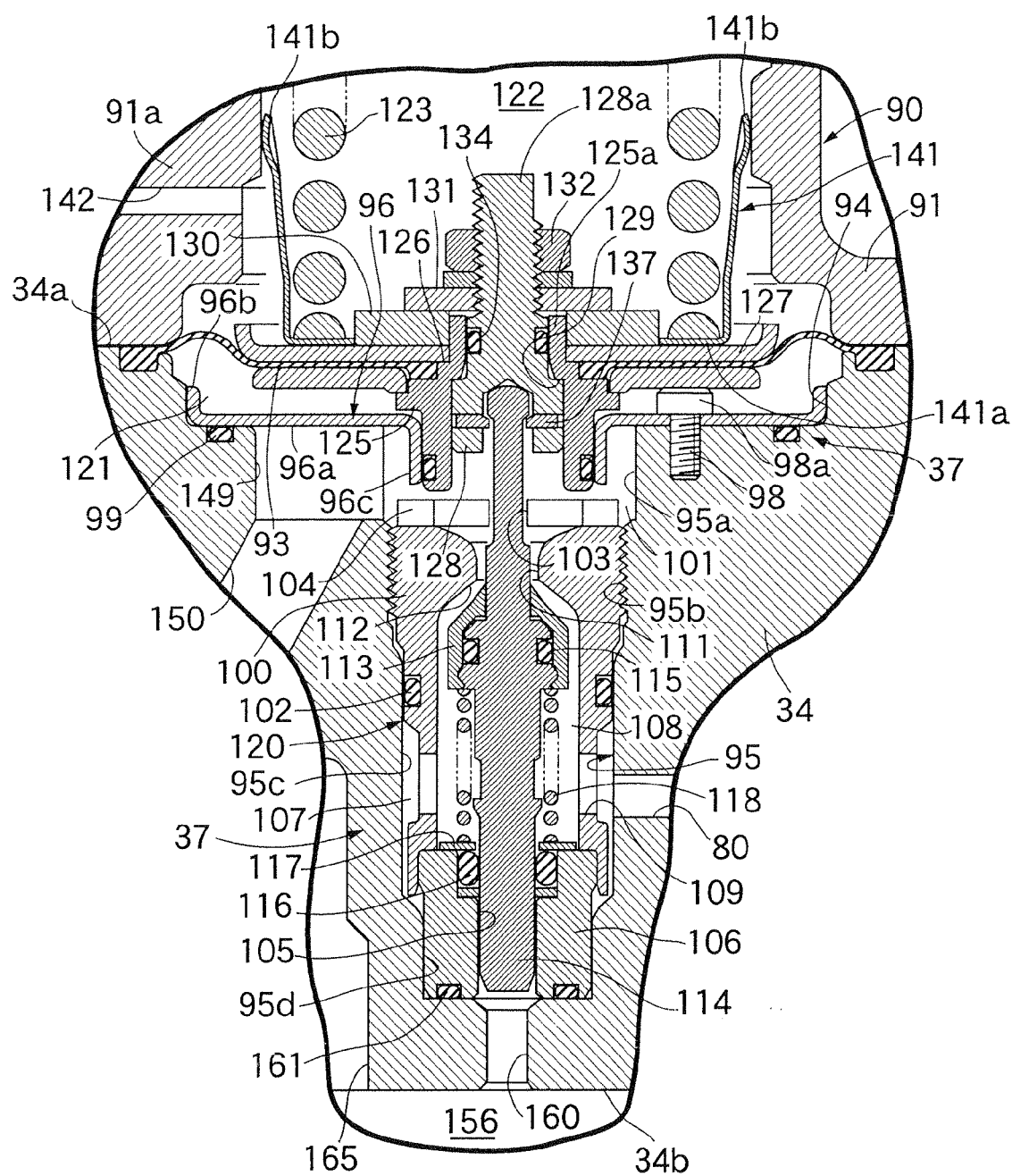
FIG. 8 is an enlarged longitudinal section showing a part of the pressure reducing valve shown in FIG. 2 (first embodiment).

With reference to FIGS. 7 and 8 together, a valve housing 90 of the pressure reducing valve 37 is comprised of the body 34 and a cover 91 fixed by multiple bolts 92 on a top surface 34a of the body 34, where a rim of a diaphragm 93 is sandwiched between the top surface 34a of the body 34 and the cover 91 having a cylinder 91a.

A concave portion 94 is provided on the top surface 34a of the body 34. The body 34 has a bulkhead member 96 to be fitted into the concave portion 94 fixed thereon, and has a mounting hole 95 opening its upper end and extending downward provided at the center of the closed end of the concave portion 94. The mounting hole 95 is comprised of a large-diameter hole portion 95a opening its upper end at the center of the closed end of the concave portion 94, a screw hole portion 95b of a smaller diameter than the large-diameter portion 95a and having its upper end coaxially continuing to a lower end of the large-diameter portion 95a, a mean-diameter hole portion 95c of a smaller diameter than the screw hole portion 95b and having its upper end coaxially continuing to the lower end of the screw hole portion 95b, and a small-diameter hole portion 95d of a smaller diameter than the mean-diameter hole portion 95c and having its upper end coaxially continuing to the lower end of the mean-diameter hole portion 95c, where the passage 80 for leading the CNG from the electromagnetic isolation valve 36 is opened on the inner surface of the mean-diameter hole portion 95c.

Figure 9:
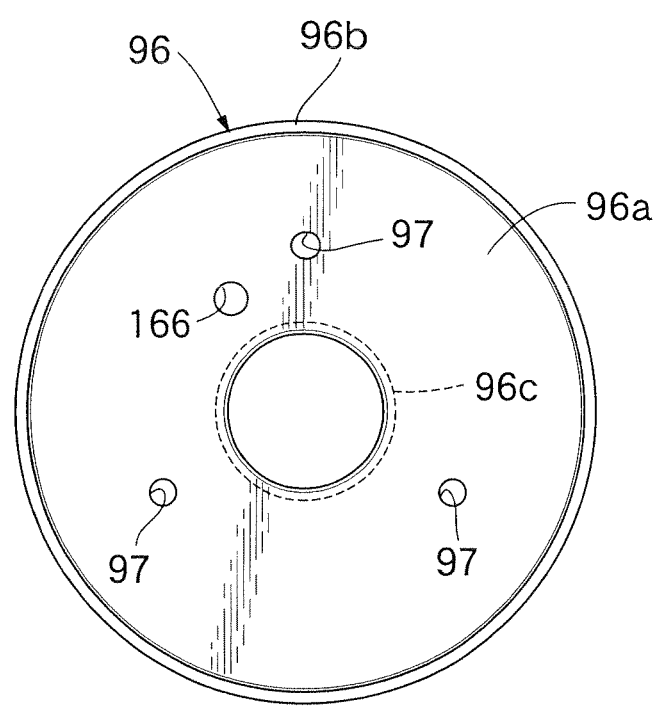
FIG. 9 is a plan view of a bulkhead member (first embodiment).

With reference to FIG. 9 in addition, the bulkhead member 96 is integrally comprised of an annular plate portion 96a opposed to the closed end of the concave portion 94, a short cylinder 96b continuing to the outer circumference of the annular plate portion 96a and fitted into the concave portion 94, and a cylindrical guide tube portion 96c continuing to an inner circumference of the annular plate portion 96a and extending on the opposite side to the short cylinder 96b, where a sheet iron is press-stamped.

Multiple insertion holes 97 such as three of them, for instance, are provided at positions surrounding the guide tube portion 96c with equal spacing in a circumferential direction. Bolts 98 inserted into the insertion holes 97 are screwed on the body 34 and fastened so as to fix the bulkhead member 96 on the body 34. Furthermore, an annular seal member 99 surrounding each of the bolts 98 is mounted at the closed end of the concave portion 94 by elastically contacting the annular plate portion 96a of the bulkhead member 96.

The screw hole portion 95b of the mounting hole 95 has a cylindrical valve seat member 100 engaged therewith to form a decompression chamber 101 between itself and the bulkhead member 96. The valve seat member 100 has an annular seal member 102 mounted on the outer circumference thereof for the sake of elastically contacting the entire circumference on the inner surface of the mean-diameter hole portion 95c at a higher place than the opening end of the passage 80 leading the CNG from the electromagnetic isolation valve 36.

The valve seat member 100 has multiple projections 104 such as four of them, for instance, placed on the end face of the decompression chamber 101 side thereof for the sake of mutually forming multiple grooves 103 such as four of them, for instance, extending in a radial direction of the valve seat member 100 in the plane orthogonal to an axis line of the mounting hole 95. The grooves 103 are placed crisscross. When screwing the valve seat member 100 in the screw hole portion 95b, it is possible to rotate the valve seat member 100 by engaging a tool not shown with the grooves 103 placed crisscross so as to easily mount the valve seat member 100 on the body 34.

The valve seat member 100 has a cylindrical guide member 106 having a guide opening 105 coaxial with the mounting hole 95 pressed into the end portion of the opposite side to each of the projections 104, that is, the lower end portion of the valve seat member 100. The guide member 106 is fitted into the small-diameter hole portion 95d of the mounting hole 95. And an annular chamber 107 leading to the passage 80 is formed between the outer circumference of the valve seat member 100 and the guide member 106 mutually coupled by press fitting and the inner surface of the mean-diameter hole portion 95c of the mounting hole 95.

A valve chamber 108 is formed between the valve seat member 100 and the guide member 106, and multiple continuous holes 109 for leading the valve chamber 108 to the annular chamber 107 are provided on a side wall of the valve seat member 100.

A valve hole 111 leading to the decompression chamber 101 is formed at the end of the decompression chamber 101 side of the valve seat member 100. And a valve seat 112 facing the valve chamber 108 while having the valve hole 111 opened at the center is formed on the valve seat member 100.

A valve element 113 made of the synthetic resin and capable of being seated on the valve seat 112 is accommodated in the valve chamber 108. The valve element 113 is fixed at an intermediate portion of a valve shaft 114 which is coaxially inserted into the valve hole 111 with its one end projected to the decompression chamber 101 side.

The valve element 113 is cylindrically formed by tapering its one end face opposed to the valve seat 112 in order to be seated on the valve seat 112 which is tapered, and is fixed to the valve shaft 114 by having the valve shaft 114 elastically fitted with the valve element 113. Furthermore, the valve shaft 114 has an O ring 115 for elastically contacting the inner surface of the valve element 113 mounted on the outer surface thereof.

The other end of the valve shaft 114 is slidably fitted in the guide opening 105 by slidably contacting an O ring 116 mounted between itself and the inner surface of the guide opening 105. A retainer plate 117 for holding the O ring 116 on the inner circumference of the guide opening 105 is in contact with the end face on the valve chamber 108 side of the guide member 106, and a spring 118 for exerting the spring force in the direction for seating the valve element 113 on the valve seat 112 is provided between the retainer plate 117 and the valve element 113.

The valve seat member 100, guide member 106, valve element 113, valve shaft 114 and spring 118 are preassembled to form a valve action unit 120 which will be mounted on the body 34 from the top surface 34a side.

The diaphragm 93 forms a pressure action chamber 121 between itself and the bulkhead member 96 and also forms a spring chamber 122 between itself and the cover 91 so as to be supported by the valve housing 90. The bulkhead member 96 isolates the decompression chamber 101 and the pressure action chamber 121 from each other. Furthermore, the deflection of the diaphragm 93 to the pressure action chamber 121 side is regulated by putting the bulkhead member 96 in contact with diameter expansion head 98a of the multiple bolts 98 for fixing the bulkhead member 96 on the body 34. The spring chamber 122 in the cover 91 has a coil spring 123 for energizing the diaphragm 93 to the decompression chamber 101 side accommodated therein.

The cylinder 91a of the cover 91 has an accommodation hole 124 extending coaxially with the valve hole 111 provided therein by opening its outer end. The accommodation hole 124 is comprised of a screw hole portion 124a on an axially lateral side and a slide hole portion 124b on an axially internal side coaxially continuing to the screw hole portion 124a as a larger diameter than the screw hole portion 124a.

The surface facing the decompression chamber 101 side at the center of the diaphragm 93 is contacted by a first diaphragm retainer 125 integrally comprising a cylinder 125a penetrating the center of the diaphragm 93 and projecting to the spring chamber 122 side. The surface facing the spring chamber 122 side at the center of the diaphragm 93 is contacted by a second diaphragm retainer 127 for engaging its internal circumference with an annular step portion 126 provided on the outer surface of the cylinder 125a and sandwiching the center of the diaphragm 93 between itself and the first diaphragm retainer 125.

A diaphragm rod 128 is coupled to one end of the valve shaft 114, that is, the end of the diaphragm 93 side. And the diaphragm rod 128 is inserted into the center of the first diaphragm retainer 125 from the decompression chamber 101 side. An annular step portion 129 facing the decompression chamber 101 side is provided on the inner surface of the cylinder 125a of the first diaphragm retainer 125, and the diaphragm rod 128 is engaged with the annular step portion 129. The second diaphragm retainer 127 is sandwiched between the diaphragm 93 and an auxiliary retainer 130. A nut 132 having a washer 131 intervening between itself and the auxiliary retainer 130 is engaged with a screw shaft portion 128a provided as a projection from the cylinder 125a to the diaphragm rod 128. The nut 132 is fastened so as to sandwich the center of the diaphragm 93 between the diaphragm retainers 125 and 127 and couple the valve shaft 114 to the center of the diaphragm 93. Furthermore, an O ring 134 mounted on the outer circumference of the diaphragm rod 128 elastically contacts the inner surface of the cylinder 125a in order to seal the decompression chamber 101 and the spring chamber 122.

Figure 10:
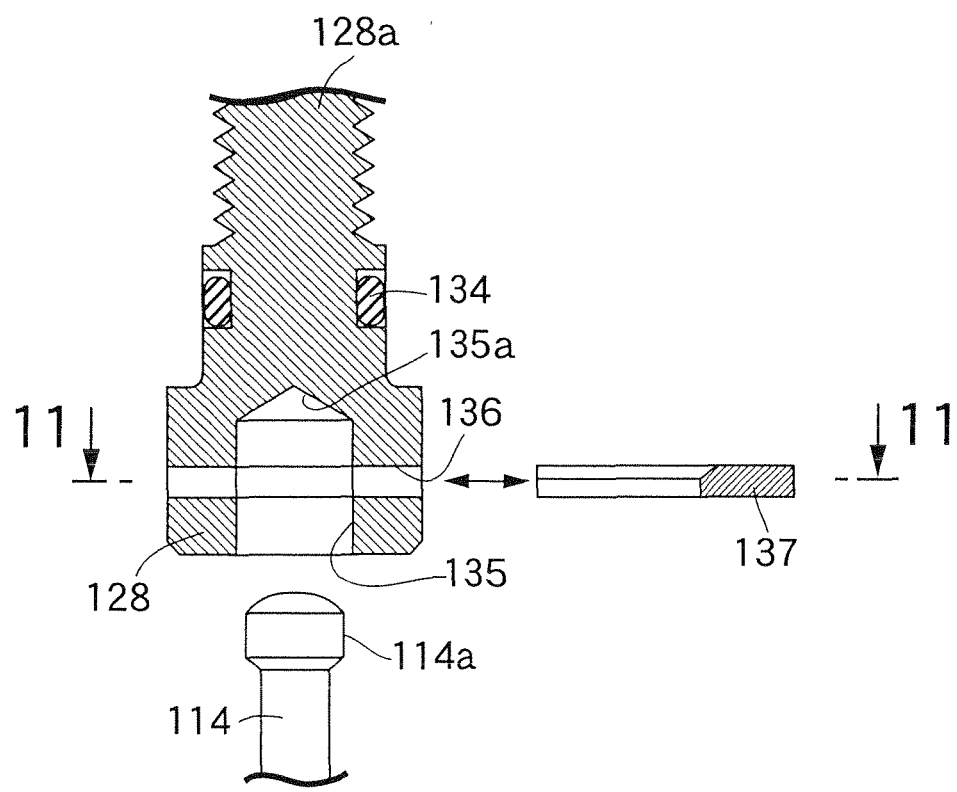
FIG. 10 is an exploded sectional view of a coupling portion of a valve shaft and a diaphragm rod (first embodiment)
Figure 11:
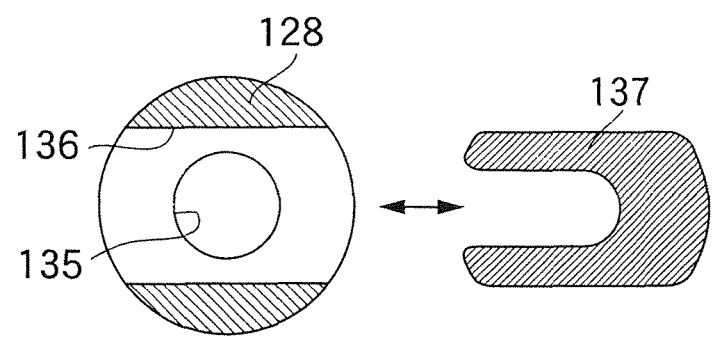
FIG. 11 is a sectional view along a line 11-11 in FIG. 10 (first embodiment).

In FIGS. 10 and 11, a voluminous portion 114a of which end is spherical is provided at one end of the valve shaft 114. A fitting concave portion 135 is coaxially provided at the end of the valve shaft 114 side of the diaphragm rod 128, and the closed end of the fitting concave portion 135 is formed as a taper surface 135a. And the voluminous portion 114a is swingably fitted into the fitting concave portion 135 so as to have its end contact the closed end of the fitting concave portion 135.

Furthermore, the diaphragm rod 128 has a slit 136 lying along the plane orthogonal to its axis line provided thereon by crossing the fitting concave portion 135. And a clip member 137 formed substantially in a U-shape is detachably inserted into the slit 136 by engaging with the voluminous portion 114a of the valve shaft 114 of which one end is fitted into the fitting concave portion 135 from the valve seat member 100 side.

Furthermore, the diaphragm rod 128 is inserted into the cylinder 125a of the first diaphragm retainer 125 to prevent the clip member 137 from breaking away from the diaphragm rod 128 so as to maintain the state in which the one end of the valve shaft 114 is swingably coupled to the diaphragm rod 128.

An outer end opening portion of the accommodation hole 124, that is, the screw hole portion 124a has a bottomed-cylinder-like adjusting screw 138 movably mounted thereon. The adjusting screw 138 has an O ring 144 mounted on the outer circumference of an open end thereof for the sake of elastically contacting the entire circumference on the inner surface of the slide hole portion 124b of the accommodation hole 124. The adjusting screw 138 has an engaging concave portion 139 for engaging with a tool for adjusting a movement position of the adjusting screw 138 provided on the outer surface of the closed end thereof.

A projection 138a is provided on the inner surface at the center of the closed end of the adjusting screw 138. And the coil spring 123 is compactly placed between a retainer 140 fitted in and held by the projection 138a and a leaf spring 141 contacted by the auxiliary retainer 130 mounted on the diaphragm 93 on the spring chamber 122 side. Therefore, it is possible to adjust a spring load of the coil spring 123 by adjusting the movement position of the adjusting screw 138.

The leaf spring 141 provides slide resistance to the diaphragm 93 by frictionally contacting the inner surface of the cylinder 91a of the cover 91. The leaf spring 141 is comprised of a bottomed-cylinder-like cup portion 141a having its closed end sandwiched between the auxiliary retainer 130 mounted on the center of the diaphragm 93 on the spring chamber 122 side and the coil spring 123, and multiple leaf portions 141b placed integrally and continuously at the opening end of the cup portion 141a by elastically and slidably contacting multiple locations such as eight locations with equal spacing in the circumferential direction on the inner surface of the slide hole portion 124b of the cylinder 91a.

A base of the cylinder 91a of the cover 91 has a negative pressure passage 142 leading to the spring chamber 122 provided thereon, and a connecting pipe 143 leading to the negative pressure passage 142 is mounted on the cover 91 by press fitting. And the connecting pipe 143 is connected to the engine E, and an intake negative pressure of the engine E is led into the spring chamber 122.

In the state of no high-pressure CNG flowing into the valve chamber 108, the pressure reducing valve 37 has the diaphragm 93 deflected to the decompression chamber 101 side by the spring force of the coil spring 123, and the valve element 113 breaks away from the valve seat 112 and has the valve hole 111 opened thereon. The high-pressure CNG having flowed into the valve chamber 108 flows into the decompression chamber 101 side from the valve hole 111, and if the pressure of the decompression chamber 101 increases to the extent of deflecting the diaphragm 93 to the spring chamber 122 side against the spring force of the coil spring 123, the valve element 113 gets seated on the valve seat 112 and the valve hole 111 is closed. Such opening and closing of the valve hole 111 are repeated so that the CNG having flowed into the valve chamber 108 at the high pressure of 25 to 1 MPa, for instance, has its pressure reduced to 0.2 to 0.3 MPa, for instance, in the decompression chamber 101.

In FIG. 2 again, the filter cover 42 is detachably mounted on an undersurface 34b which is the surface opposite to the top surface 34a of the body 34 which is the side for mounting the pressure reducing valve 37 on the body 34. The filter cover 42 is formed like a bottomed cylinder by having a flange portion 42a on its open end side. The flange portion 42a is mounted on the undersurface 34b of the body 34 by multiple bolts 146 such as four of them for instance, and an annular seal member 147 elastically contacting the open end of the filter cover 42 is mounted on the undersurface 34b of the body 34.

The oil filter 38 placed at the position offset from the axis line of the pressure reducing valve 37 and having the axis line parallel with that of the pressure reducing valve 37 is mounted on the body 34 to be sandwiched between the filter cover 42 and the body 34.

A mounting concave portion 148 for inserting one end of the oil filter 38 is provided on the undersurface 34b of the body 34. On an internal surface of the large-diameter portion 95a of the mounting hole 95 provided on the body 34 to mount the valve action unit 120 of the pressure reducing valve 37, a communicating concave portion 149 leading to the decompression chamber 101 while having an opening on the closed end side of the concave portion 94 is formed in the portion corresponding to the oil filter 38 so as to be narrower as it goes radially outside the mounting hole 95. The end of the communicating concave portion 149 is placed more inward than the seal member 99 mounted on the closed end of the concave portion 94, and the opening of the communicating concave portion 149 to the closed end of the concave portion 94 is closed by the bulkhead member 96.

The body 34 has a gas passage 150 having its upper end opened at the end of the communicating concave portion 149 provided thereon to communicate with the decompression chamber 101 via the communicating concave portion 149. The gas passage 150 is formed to be more inclined to the side breaking away from the pressure reducing valve 37 as it goes downward. A catching hole 151 extending vertically while leading to the lower end of the gas passage 150 is provided on the body 34 by opening its lower end at the center of the closed end of the mounting concave portion 148.

The oil filter 38 has a mesh portion 153 for allowing the gas flow provided in a part of the cylindrical side wall of a filter case 152 made of the synthetic resin. And an elastic member 154 is mounted on the one end of the filter case 152 by fitting the bottom of the cylinder 154a with the top of the filter case 152 to have the cylinder 154a communicate with the inside of the filter case 152, the elastic member 154 having a cylinder 154a elastically fitting one end thereof into the catching hole 151 and a collar portion 154b jutting outward from the intermediate portion of the cylinder 154a by being sandwiched between one end of the filter case 152 and the closed end of the mounting concave portion 148 integrally provided thereon.

The filter cover 42 is detachably mounted on the undersurface 34b of the body 34 by covering the projection of the oil filter 38 from the undersurface 34b of the body 34. An oil storage chamber 156 for storing the oil oozing from the mesh portion 153 of the oil filter 38 is formed around the oil filter 38 in the filter cover 42.

A drain hole 157 is provided in the portion corresponding to the oil filter 38 at the bottom of the filter cover 42. The drain hole 157 is liquid-tightly closed by a drain bolt 159 screwed in the drain hole 157 with an annular seal member 158 intervening between itself and the undersurface of the filter cover 42, and the lower end of the filter case 152 in the oil filter 38 contacts the inner end of the drain bolt 159. To be more specific, the oil filter 38 is sandwiched between the drain bolt 159 screwed in the filter cover 42 and the body 34. Furthermore, the drain hole 157 is formed to have an internal diameter allowing insertion and removal of the oil filter 38 so that replacement of the oil filter 38 is possible by mounting and removal of the drain bolt 159.

A back-pressure hole 160 having its lower end communicating with the oil storage chamber 156 is provided on the undersurface 34b of the body 34 coaxially with the mounting hole 95 provided on the body 34 to mount the valve action unit 120 of the pressure reducing valve 37. The upper end of the back-pressure hole 160 communicates with the guide opening 105 of the guide member 106. Furthermore, the guide member 106 has an annular seal member 161 surrounding the back-pressure hole 160 mounted on its lower end to elastically contact the body 34 so that the back pressure from the oil storage chamber 156 is exerted on the valve shaft 114 of the pressure reducing valve 37.

The second side face 45 of the body 34 has the outer end of an outlet passage 164 provided on the body 34 by extending in parallel with the inlet passage 59 above the oil storage chamber 156 opened thereon. And a gas passage 165 extending vertically with its upper end leading to the inner end of the outlet passage 164 is provided on the body 34 by opening its lower end at the upper end of the oil storage chamber 156. To be more specific, the top of the oil storage chamber 156 leads to the outlet passage 164 via the gas passage 165.

As for the annular plate portion 96a of the bulkhead member 96 for isolating the pressure action chamber 121 facing one surface of the diaphragm 93 from the decompression chamber 101 for generating a gas pressure to be exerted on the pressure action chamber 121 in the pressure reducing valve 37, a continuous hole 166 communicating with the pressure action chamber 121 is provided to the portion contacting the closed end of the concave portion 94 more inward than the annular seal member 99 placed between the annular plate portion 96a and the body 34. The other end of an aspirator passage 167 provided on the body 34 with its one end communicating with the continuous hole 166 communicates with the outlet passage 164.

Furthermore, the body 34 has an aspirator tube 168 opening toward a downstream side in a gas flow direction inside the outlet passage 164 mounted thereon by being partially placed inside the outlet passage 164. The other end of the aspirator passage 167 is connected to the aspirator tube 168.

The relief valve 39 is mounted on the side of the filter cover 42 on the side corresponding to the second side face 45 of the body 34. The relief valve 39 has a valve element 172 having a rubber seal 171 capable of closing up a valve hole 169 on its front end and a spring 173 for spring-energizing the valve element 172 in the direction for closing up the valve hole 169 with the rubber seal 171 accommodated in a valve housing 170 having the valve hole 169 leading to the oil storage chamber 156 at its end and airtightly screwed on the side of the filter cover 42. The valve housing 170 and valve element 172 are formed to be able to release the CNG from the oil storage chamber 156 to the outside on opening the valve hole 169.

Next, the action of this embodiment will be described. The valve housing 90 of the pressure reducing valve 37 of the regulator for gas R is comprised of the body 34 having the concave portion 94 facing the diaphragm 93 side, and the cover 91 coupled to the body 34 by sandwiching the rim of the diaphragm 93 between itself and the body 34. The bulkhead member 96 for isolating the pressure action chamber 121 facing one surface of the diaphragm 93 from the decompression chamber 101 generating the pressure to be exerted on the pressure action chamber 121 is formed by press-stamping the sheet iron, and the bulkhead member 96 to be fitted in the concave portion 94 is fixed on the body 34.

Therefore, it is possible to miniaturize the pressure reducing valve 37 without having the bulkhead member 96 placed between the body 34 and the cover 91, and it is further possible to form the bulkhead member 96 at low cost.

The bulkhead member 96 is fixed on the body 34 with the bolts 98 having the diameter expansion heads 98a for regulating the deflection to the pressure action chamber 121 side of the diaphragm 93 by contacting the plane on the pressure action chamber 121 side of the diaphragm 93. Therefore, it is no longer necessary to provide the portion for regulating the deflection of the diaphragm 93 to the bulkhead member 96, so that the form of the bulkhead member 96 can be simplified.

In the portion contacting the inner surface of the concave portion 94, the continuous hole 166 communicating with the pressure action chamber 121 is provided to the bulkhead member 96, the outlet passage 164 communicating with the decompression chamber 101 is provided to the body 34, and the other end of the aspirator passage 167 provided to the body 34 by having its one end leading to the continuous hole 166 is communicating with the outlet passage 164. Therefore, it is possible to improve pressure reduction control performance of the pressure reducing valve 37 while preventing the gas of the decompression chamber 101 from directly acting on the pressure action chamber 121.

Furthermore, the other end of the aspirator passage 167 is connected to the aspirator tube 168 mounted on the body 34 with the opening toward the downstream side of the gas flow direction inside the outlet passage 164. Therefore, the gas in the aspirator tube 168 and aspirator passage 167 is drawn by the gas flow flowing in the outlet passage 164, and so it is possible to exert a more stable pressure on the pressure action chamber 121 so as to improve the pressure reduction control performance.

The pressure reducing valve 37 has the valve action unit 120 formed by preassembling the valve seat member 100 having the valve hole 111 and valve seat 112 provided thereon, guide member 106 having the guide opening 105 and pressed into the valve seat member 100, valve shaft 114 having the valve element 113 capable of being seated on the valve seat 112 provided thereon and spring 118. The valve action unit 120 is mounted on the body 34 from the top surface 34a side in the state of having one end of the valve shaft 114 projected from the valve hole 111 and the other end of the valve shaft 114 slidably fitted into the guide opening 105. Therefore, it is easy to improve coaxial accuracy of the guide opening 105 of the guide member 106 and the valve seat 112 of the valve seat member 100 of which machining accuracy is easily improvable since they are smaller than the body 34. It is possible to improve assembly conformance after improving the coaxial accuracy while reducing costs by avoiding improvement in the machining accuracy in the portion leading to increased costs. Furthermore, it is also easy to check the airtightness and performance on the valve action unit 120 alone so as to allow improvement in yield.

One end of the valve shaft 114 is detachably coupled to the diaphragm rod 128 held at the center of the diaphragm 93 via the first and second diaphragm retainers 125 and 127. The fitting concave portion 135 for swingably fitting the voluminous portion 114a provided at one end of the valve shaft is coaxially provided at the end of the valve shaft 114 side of the diaphragm rod 128. And the clip member 137 engaged with the voluminous portion 114a from the valve seat member 100 side is detachably inserted into the slit 136 provided on the diaphragm rod 128 along the plane orthogonal to the axis line of the diaphragm rod 128.

Thus, it is possible to swingably couple the valve shaft 114 to the diaphragm rod 128. Therefore, it is possible, even if the axis line of the diaphragm rod 128 deviates from the axis lines of the valve seat 112 and guide opening 105, to couple the valve shaft 114 to the diaphragm rod 128 while maintaining the axis lines of the guide opening 105 and valve seat 112. It is thereby feasible to improve seat performance when the valve element 113 gets seated on the valve seat 112 and prevent the diaphragm 93 from sagging disproportionately due to inclination of the valve shaft 114 so as to improve pressure reduction controllability.

Furthermore, in the case of coupling the valve shaft 114 to the diaphragm rod 128 by screwing, there is a possibility of leading to reduction in the assembly conformance and reduction in reliability due to generation of chips. However, it is possible to improve the assembly conformance and reliability since the clip member 137 inserted into the slit 136 of the diaphragm rod 128 just has to be engaged with the voluminous portion 114a at one end of the valve shaft 114.

Furthermore, the regulator for gas R has at least the electromagnetic isolation valve 36 and pressure reducing valve 37 provided on the body 34. In this embodiment, the high-pressure filter 35 and thermostat 40 are placed on the body 34 other than the electromagnetic isolation valve 36 and pressure reducing valve 37. However, the oil filter 38 placed between the pressure reducing valve 37 and the outlet passage 164 is mounted on the body 34, and so at least the electromagnetic isolation valve 36, pressure reducing valve 37 and oil filter 38 are integrated on the body 34 so as to simplify a gas pressure reducing system and reduce the costs.

The mounting concave portion 148 is mounted on the body 34 correspondingly to the oil filter 38. The oil filter 38 having its one end inserted into the mounting concave portion 148 is sandwiched between the filter cover 42 detachably mounted on the body 34 by covering the projection of the oil filter 38 from the body 34 and the body 34 so as to facilitate the mounting of the oil filter 38 and set maximum capacity of the oil filter 38 while miniaturizing the body 34.

The oil filter 38 has the mesh portion 153 for allowing the gas flow provided in a part of the side wall of the cylindrical filter case 152 made of the synthetic resin. The catching hole 151 opening at the closed end of the mounting concave portion 148 is provided on the body 34 so as to lead to the gas passage 150 provided on the body 34 for the sake of leading the gas pressure-reduced by the pressure reducing valve 37. And the elastic member 154 is mounted on the one end of the filter case 152 by having the cylinder 154a communicate with the inside of the filter case 152, the elastic member 154 having the cylinder 154a elastically fitting one end thereof into the catching hole 151 and a collar portion 154b jutting outward from the cylinder 154a by being sandwiched between one end of the filter case 152 and the closed end of the mounting concave portion 148 integrally provided thereon. The oil storage chamber 156 for storing the oil oozing from the mesh portion 153 of the oil filter 38 is formed around the oil filter 38 in the filter cover 42 by having its upper end leading to the outlet passage 164.

For this reason, it is possible to mount the oil filter 38 connected to the downstream side of the pressure reducing valve 37 on the body 34 airtightly and securely, and its removal is also easy. Furthermore, it is easy to prevent the oil from flowing out to the outlet passage 164 side by storing the oil oozing from the oil filter 38 in the oil storage chamber 156.

The drain hole 157 liquid-tightly closed by the drain bolt 159 is provided at the bottom of the filter cover 42. Therefore, it is easy to remove the oil stored in the oil storage chamber 156 by mounting and removing the drain bolt 159 on inspection so as to improve maintainability.

As the relief valve 39 is mounted on the filter cover 42, it is unnecessary to secure a space for placing the relief valve 39 on the body 34 side so as to allow miniaturization of the body 34. Furthermore, it is possible, by making it unnecessary to provide a passage leading to the relief valve 39 on the body 34, to simplify a passage form inside the body 34 and enhance a degree of freedom in terms of passage placement.

Furthermore, while the filter cover 42 is mounted on the undersurface 34b of the body 34, the valve action unit 120 as a part of the pressure reducing valve 37 is mounted on the body 34 from the top surface 34a side of the body 34, and the back-pressure hole 160 for exerting the back pressure on the pressure reducing valve 37 is provided on the body 34 by leading to the oil storage chamber 156. Therefore, it is possible to render an assembly direction of the pressure reducing valve 37 opposite to a mounting direction of the filter cover 42 on the body 34 so as to improve the assembly conformance of the pressure reducing valve 37. And it is also possible to simplify the passage form leading to the pressure reducing valve 37 inside the body 34 and exert the back pressure on the pressure reducing valve 37 with a simple structure.

The embodiment of the present invention was described above. However, the present invention is not limited to the embodiment, but various design changes can be made without deviating from the present invention described in the claims.

The invention claimed is:

1. A method of assembling a pressure reducing valve, wherein the pressure reducing valve comprises a valve housing made by combining a body and a cover, a diaphragm of which a rim is sandwiched between the body and the cover, a diaphragm rod held at the center of the diaphragm via diaphragm retainers, a valve shaft having one end thereof coupled to the diaphragm rod and the other end slidably fitted into a guide opening provided on the body side, the guide opening being in open communication with an oil storage chamber via a back-pressure hole defined in the body, and a valve element provided in an intermediate portion of the valve shaft and capable of being seated at a valve seat fixedly placed in the body and opening a valve hole for having the valve shaft movably inserted therein at the center, the method comprising the steps of:
pressing a guide member, having the guide opening, into a valve seat member having the valve hole and the valve seat provided thereon,
assembling the valve seat member with the guide member and the valve shaft into a valve action unit while having one end of the valve shaft projected from the valve hole and the other end of the valve shaft slidably fitted into the guide opening, and
mounting said valve action unit to the body,
wherein the pressure reducing valve is provided in a regulator for gas, and the regulator comprises an oil filter which is arranged between the body and a filter cover mounted to the body, the filter cover covering the oil filter, wherein the oil filter comprises a cylindrical filter case allowing a gas to flow, a gas passage is defined in the body in communication with an inside of the filter case so as to guide a gas which has been pressure-reduced by the pressure reducing valve, and the oil storage chamber is defined around the oil filter to store oil oozing from a mesh portion of the oil filter.

2. The method according to claim 1, wherein a fitting concave portion which fits therein a voluminous portion provided at one end of the valve shaft and is coaxially provided at an end of the diaphragm rod opposing the valve shaft, the method comprising a further step of detachably inserting a clip member into a slit provided on the diaphragm rod along a plane orthogonal to an axis line of the diaphragm rod while making the clip member engage the voluminous portion provided at the one end of the valve shaft.

3. The method according to claim 1, wherein the body has a concave portion formed therein and opposing the diaphragm provided thereon, a bulkhead member is provided on the concave portion of the body and is airtightly and movably penetrated by the valve shaft, and the bulkhead member defines a pressure action chamber formed between the bulkhead member and the diaphragm and a decompression chamber formed between the bulkhead member and the valve seat member, the method comprising a further step of press-stamping sheet iron to form the bulkhead member and fixing the bulkhead member into the concave portion.

4. The method according to claim 3, further comprising a step of fixing the bulkhead member on the body with a bolt having a diameter expansion head which regulates deflection of the pressure action chamber side of the diaphragm by contacting a diaphragm retainer engaging the pressure action chamber side of the diaphragm.

5. The method according to claim 3, wherein the bulkhead member has a continuous hole leading to the pressure action chamber provided in a portion contacting an inner surface of the concave portion, the body has an outlet passage leading to the decompression chamber provided thereon, and an aspirator passage provided on the body with one end thereof leading to the continuous hole and the other end communicating with the outlet passage.

6. The method according to claim 5, wherein the other end of the aspirator passage is connected to an aspirator tube mounted on the body with an opening toward a downstream side of a gas flow direction inside the outlet passage.

7. A regulator for gas including the pressure reducing valve obtained by the method according to claim 1, wherein at least an electromagnetic isolation valve and the pressure reducing valve are provided on the body on which an inlet passage and the outlet passage are provided so as to intervene between the inlet passage and the outlet passage, and said oil filter is mounted between the pressure reducing valve and the outlet passage.

8. The regulator for gas according to claim 7, wherein the body has a mounting concave portion provided thereon, and the oil filter has one end thereof inserted into the mounting concave portion and the filter cover is detachably mounted on the body by covering a projection of the oil filter from the body.

9. The regulator for gas according to claim 8, wherein
the cylindrical filter case that is made of a synthetic resin,
- the body has a catching hole defined at a closed end of the mounting concave portion and which communicates with the gas passage wherein the gas, which has been pressure-reduced by the pressure reducing valve, passes through the catching hole and the gas passage to the oil filter,
- an elastic member integrally includes a cylinder that is provided in the catching hole and a collar portion extending outward away from an outer circumferential surface of the cylinder and which is sandwiched between one end of the filter case and the closed end of the mounting concave portion mounted thereon, the cylinder of the elastic member extending inside the filter case.

10. The regulator for gas according to claim 9, wherein a relief valve is mounted on the filter cover.

11. The regulator for gas according to claim 9, wherein the filter cover is mounted on an undersurface of the body, a part of the pressure reducing valve is mounted on the body from a topside of the body, and the back-pressure hole exerts a back pressure on the pressure reducing valve.

12. The regulator for gas according to claim 8, wherein a drain hole liquid-tightly closed by a drain bolt is provided at the bottom of the filter cover.

13. The regulator for gas according to claim 12, wherein a relief valve is mounted on the filter cover.

14. The regulator for gas according to claim 8, wherein a relief valve is mounted on the filter cover.

\* \* \* \* \*